Patented Dec. 20, 1938

2,141,058

UNITED STATES PATENT OFFICE 2,141,058

METHOD OF PRODUCING SUBSTITUTED ALKALI METAL AMIDES

Karl Ziegler, Heidelberg, Germany, assignor to Schering A. G., Berlin, Germany, a corporation of Germany No Drawing. Application June 4, 1934, Serial No. 728,856. In Germany June 7, 1933

15 Claims. (Cl. 260—583)

This invention relates to a method of producing substitution products of primary or secondary organic amines and more particularly to the production of alkali metal substitution products of said amines.

Hitherto, the latter have usually been obtained by the action of alkali metals, alkali amides or alkali hydrides upon amines. These known processes, however, have the disadvantage that they can be applied almost exclusively only to those amines which contain at least one aromatic or heterocyclic-aromatic nucleus in the molecule. In these cases, the reaction has usually to be carried out at a high temperature, thus unfavorably influencing the quality of the final products.

Primary and secondary purely aliphatic or alicyclic amines react with the above mentioned agents only with difficulty or not at all. The alkali metal substitution products of these amines, however, are obtained for instance by the action of alkali organic compounds. Thus, the reaction of diethylamine with lithium phenyl or lithium butyl has already become known. This reaction takes place already in the cold and yields very readily lithium diethyl amide. Also aromatic primary or secondary amines are transformed very readily and without any decomposition into metal substitution products by means of alkali metal organic compounds.

The latter method, however, has the very great disadvantage that the working with alkali metal organic compounds on a large scale is rather inconvenient and dangerous on account of their sensibility and their being spontaneously inflammable.

Now it has been found that the production of the alkali metal-organic compound and its action upon amines can be carried out in one operation. Such amines may be designated by the general formula

wherein R is hydrogen or an aliphatic, alicyclic or aromatic and R' is an aliphatic, alicyclic or aromatic group. Thus, the troublesome isolation of the alkali metal-organic compound is avoided and a safe working on a large scale is made possible. For instance, by the action of lithium metal upon a mixture of an amine and a hydrocarbon, capable of forming alkali metal compounds, in a suitable solvent, solutions or suspensions of lithium amides can be produced in a very smooth way. Thereby as an intermediary product the addition product of lithium metal to the hydrocarbon is formed which in statu nascendi reacts with the amine. Hence, the reaction takes place according to the following equation when using naphthalene as hydrocarbon capable of forming a lithium compound:

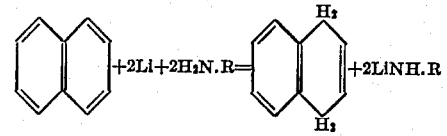

Instead of using hydrocarbons, halogenated alkyl or aryl hydrocarbons may be treated with alkali metals in the presence of amines whereby the amine reacts with the alkali-organic compound immediately on its formation in accordance with the following equations:

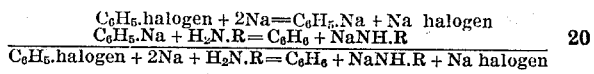
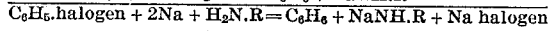

The described method enables one to use even such alkali organic compounds which can be isolated with difficulty only or not at all on account of the occurrence of certain complicated secondary reactions, for instance, polymerization and the like.

Thus, butadienes or styrene may be used with advantage since they form dihydrogenated products having a very low boiling point which do not disturb the reaction at all. These unsaturated hydrocarbons, however, polymerize very readily when trying to employ them according to the known methods.

A further important advantage of the new method consists in the fact that it is often possible to produce solutions of the substituted alkali metal amides of such a concentration as they cannot be obtained on simply dissolving the solid isolated metal amides in the same solvent.

The substituted metal amides which have become very readily available by the process of the present invention are to be used as intermediate products as well as condensation agents.

The following examples serve to illustrate the invention without, however, limiting the same to them.

*Example 1*

128 grams of naphthalene, 14 grams of small pieces of lithium, and 150 grams of diethylamine are filled up in a nitrogen atmosphere with ether to 1 liter. After a few minutes a vigorous reaction takes place whereby the ether starts to boil. The reaction is brought to an end while stirring slightly. The metal dissolves completely and an almost clear and colorless solution of the lithium diethylamide is obtained, having a two-fold normality with respect to the dissolved lithium.

*Example 2*

104 grams of styrene or 54 grams of butadiene are reacted in the same manner as described in Example 1 with 14 grams of lithium metal and 250 grams of ethylaniline. A 2 n-solution of the lithium ethyl anilide is obtained.

*Example 3*

To 112 parts of chlorobenzene or 92 parts of butylchloride in 500 parts of volume of benzene are added in a nitrogen atmosphere 100 parts of dry cyclohexylamin. 46 grams of sodium metal wire are pressed into this mixture. On vigorous stirring the metal is slowly transformed into a mixture of sodium cyclohexylamide and sodium chloride the latter being suspended in the benzene.

*Example 4*

72 parts of 1,2-dianilido-1,2-diphenylethane are suspended in 1000 parts of volume of absolute ether; to this suspension 16 parts of cyclohexadiene-(1,3) and 10 parts of finely divided sodium are added while stirring, thereby excluding any air. The sodium metal and the suspended dianilido diphenylethane are gradually dissolved and a yellow solution of disodium dianilido diphenylethane is formed.

Of course, various changes and variations may be made by those skilled in the art in the reaction conditions and components without departing from the principles of this invention as set forth in the above given specification and the claims annexed hereto.

What I claim is:

1. A method of producing organic substituted alkali metal amides which comprises subjecting a solution of a compound belonging to the group of amines consisting of primary and secondary aliphatic, alicyclic and aromatic amines in the presence of an organic compound capable of forming an alkali metal-organic compound wherein the metal is directly attached to carbon to the action of an alkali metal.

2. A method of producing organic substituted alkali metal amides which comprises subjecting a solution of a compound belonging to the group of amines consisting of primary and secondary aliphatic, alicyclic and aromatic amines in the presence of an organic compound capable of forming an alkali metal-organic compound wherein the metal is directly attached to carbon to the action of a finely divided alkali metal.

3. A method of producing organic substituted alkali metal amides which comprises subjecting a solution of a compound belonging to the group of amines consisting of primary and secondary aliphatic, alicyclic and aromatic amines in an unsaturated hydrocarbon with at least two conjugated double bonds to the action of a finely divided alkali metal.

4. A method of producing organic substituted alkali metal amides which comprises subjecting a solution of a compound belonging to the group of amines consisting of primary and secondary aliphatic, alicyclic and aromatic amines in an unsaturated hydrocarbon with at least one aromatic nucleus at the double bond to the action of a finely divided alkali metal.

5. A method of producing organic substituted alkali metal amides which comprises subjecting a suspension of a compound belonging to the group of amines consisting of primary and secondary aliphatic, alicyclic and aromatic amines in an organic compound capable of forming alkali metal-organic compounds wherein the metal is directly attached to carbon to the action of an alkali metal.

6. A method of producing organic substituted alkali metal amides which comprises subjecting a suspension of a compound belonging to the group of amines consisting of primary and secondary aliphatic, alicyclic and aromatic amines in an unsaturated hydrocarbon with at least two conjugated double bonds to the action of a finely divided alkali metal.

7. A method of producing organic substituted alkali metal amides which comprises subjecting a suspension of a compound belonging to the group of amines consisting of primary and secondary aliphatic, alicyclic and aromatic amines in an unsaturated hydrocarbon with at least one aromatic nucleus at the double bond to the action of a finely divided alkali metal.

8. A method of producing solutions of organic substituted alkali metal amides which comprises reacting a compound belonging to the group of compounds consisting of unsaturated hydrocarbons with at least two conjugated double bonds and unsaturated hydrocarbons with at least one aromatic nucleus at the double bond, halogenated alkyl compounds, and halogenated aryl compounds, with a compound belonging to the group of amines consisting of primary and secondary aliphatic, alicyclic and aromatic amines in the presence of an alkali metal.

9. A method of producing solutions of organic substituted alkali metal amides which comprises reacting a compound belonging to the group of compounds consisting of unsaturated hydrocarbons with at least two conjugated double bonds and unsaturated hydrocarbons with at least one aromatic nucleus at the double bond, halogenated alkyl compounds, and halogenated aryl compounds, with a compound belonging to the group of amines consisting of primary and secondary aliphatic, alicyclic and aromatic amines in the presence of an alkali metal and in an indifferent organic solvent.

10. A method of producing a solution of an aliphatic alkali metal amide which comprises reacting an aromatic hydrocarbon capable of adding alkali metal and an amine having the general formula

wherein R is a member of the group consisting of hydrogen and aliphatic, alicyclic and aromatic hydrocarbons, and R' is a member of the group consisting of aliphatic, alicyclic and aromatic hydrocarbons, in an indifferent organic solvent with an alkali metal and in an atmosphere free from oxygen and humidity until the alkali metal is completely dissolved.

11. A method of producing a solution of an aliphatic alkali metal amide which comprises reacting an unsaturated hydrocarbon with two conjugated double bonds capable of adding alkali metal and an amine having the general formula

wherein R is a member of the group consisting of hydrogen and aliphatic, alicyclic and aromatic hydrocarbons, and R' is a member of the group consisting of aliphatic, alicyclic and aromatic hydrocarbons, in an indifferent organic solvent with an alkali metal and in an atmosphere free from oxygen and humidity until the alkali metal is completely dissolved.

12. A method of producing organic substituted alkali metal amides which comprises reacting a mixture of a compound capable of forming alkali metal-organic compounds wherein the metal is directly attached to carbon and an amino compound having the general formula $$R-\underset{H}{N}-R'$$

wherein R is one of the groups consisting of hydrogen, aliphatic, alicyclic and aromatic and R' is one of the groups consisting of aliphatic, alicyclic and aromatic groups, in the presence of an alkali metal, whereby a reaction takes place to form an organic substituted alkali metal amide.

13. A method of producing organic substituted alkali metal amides which comprises reacting a mixture of a compound capable of forming alkali metal-organic compounds wherein the metal is directly attached to carbon with an amino compound having the general formula $$R-\underset{H}{N}-R'$$

wherein R is one of the groups consisting of hydrogen, aliphatic, alicyclic and aromatic and R' is one of the groups consisting of aliphatic, alicyclic and aromatic groups, in the presence of an alkali metal, while agitating the reaction mixture, whereby a reaction takes place to form an organic substituted alkali metal amide.

14. A method of producing organic substituted alkali metal amides which comprises subjecting a solution of a compound belonging to the group of amines consisting of primary and secondary aliphatic, alicyclic and aromatic amines in the presence of an organic compound capable of forming an alkali metal organic compound wherein the metal is directly attached to carbon to the action of an alkali metal, while agitating the reaction mixture.

15. A method of producing organic substituted metal amides which comprises subjecting a solution of an amino compound having the general formula $$R-\underset{H}{N}-R'$$

wherein R is one of the groups consisting of hydrogen, aliphatic, alicyclic and aromatic hydrocarbon radicals and R' is one of the groups consisting of aliphatic, alicyclic and aromatic hydrocarbon radicals, in the presence of an organic compound capable of forming an alkali metal organic compound wherein the metal is directly attached to carbon to the action of an alkali metal.

KARL ZIEGLER.